Sept. 9, 1952   E. WETTSTEIN   2,610,231
SYNCHRONOUS ELECTRIC CURRENT SWITCHING APPARATUS
Filed Sept. 7, 1950   3 Sheets-Sheet 1
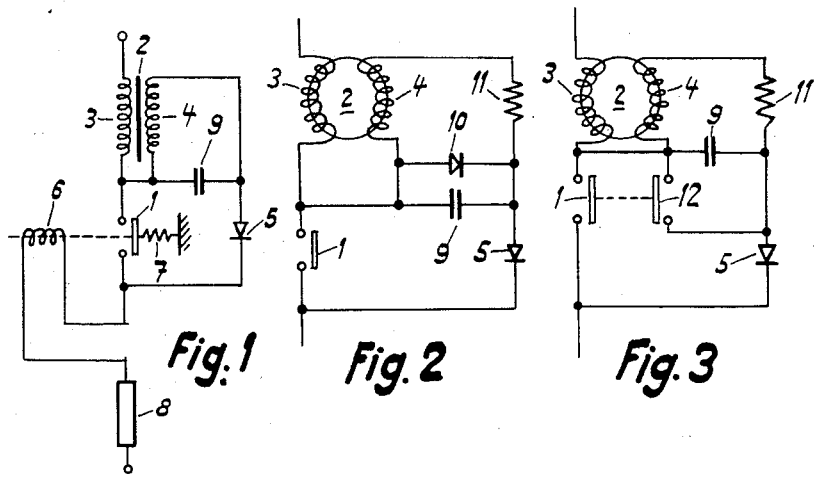
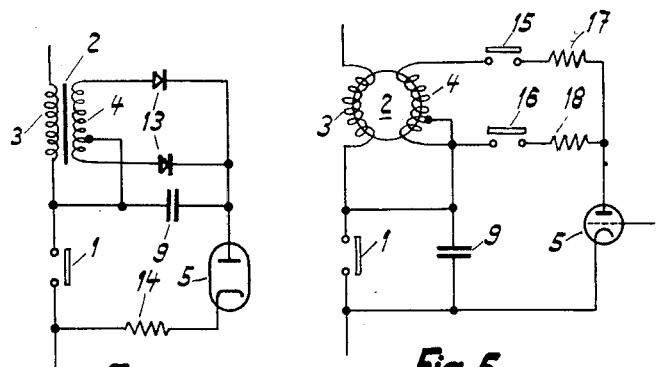
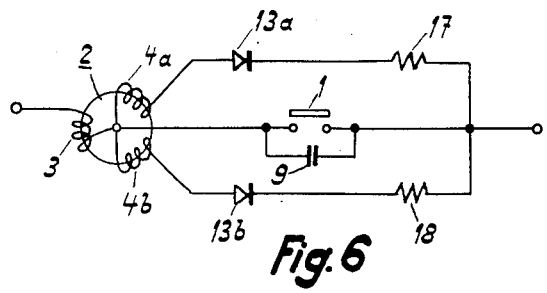
INVENTOR
Erwin Wettstein.
BY C. M. Avery
ATTORNEY INVENTOR
Erwin Wettstein.

Sept. 9, 1952          E. WETTSTEIN          2,610,231
SYNCHRONOUS ELECTRIC CURRENT SWITCHING APPARATUS
Filed Sept. 7, 1950          3 Sheets-Sheet 3
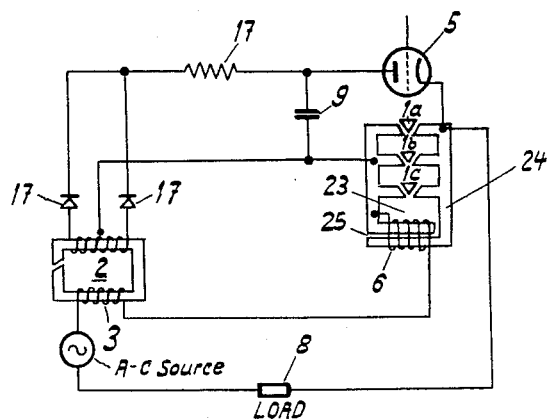
*Fig.9*
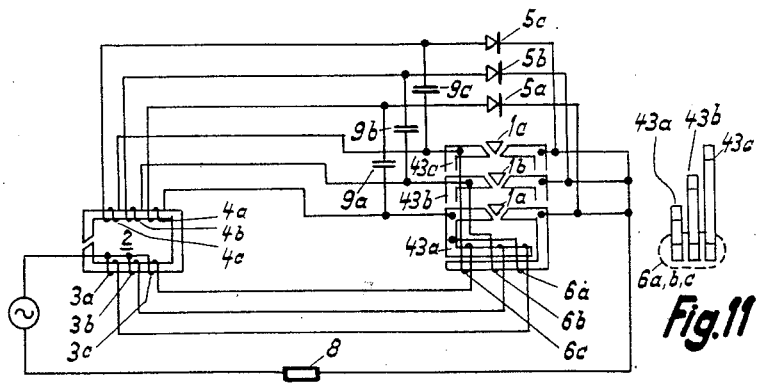
*Fig.10*          *Fig.11*
INVENTOR
Erwin Wettstein.
BY
ATTORNEY Patented Sept. 9, 1952

2,610,231

UNITED STATES PATENT OFFICE 2,610,231

SYNCHRONOUS ELECTRIC CURRENT SWITCHING APPARATUS

Erwin Wettstein, Zurich, Switzerland, assignor to FKG Fritz Kesselring Gerätebau Aktiengesellschaft, Bachtobel-Weinfelden, Switzerland, a Swiss company Application September 7, 1950, Serial No. 183,577
In Switzerland September 10, 1949

24 Claims. (Cl. 175—294)

My invention relates to electric current switching apparatus of the synchronous type and in one of its more particular aspects to periodically operating contactor apparatus for current translating purposes, such as for rectifying alternating currents.

Relating to such apparatus, it is an object of the invention to eliminate the tendency of sparking at the circuit opening and closing contacts of the appertaining contactor and to minimize the transfer of fine particles of contact material between the surfaces of these contacts.

It is known to reduce sparking by connecting a saturating switching reactor in series with the synchronous or periodic contactor. Such a reactor, being unsaturated and highly impedient at small instantaneous current values, modifies the current wave and provides a flattened, weak-current step in the vicinity of the current-zero passages, thus securing a correspondingly lengthened interval of time within which the contacts may separate at extremely low current values.

It has also been proposed to connect a valve in series with an auxiliary voltage source across the contactor contacts in order to further reduce the current in the vicinity of the current zero passages. According to this proposal, a capacitor or a phase displaced transformer voltage or a cathode reactor serve as a source of auxiliary voltage. This, however, entails several disadvantages. In the first place, a spark-free operation is possible only within a rather limited range of load variations even with a relatively large auxiliary voltage source. Furthermore, the valve connected in parallel relation to the contactor is under load not only during the switching operation but also during a considerable portion of the conductive phase, especially when the apparatus operates as a rectifier. The contactor shunt circuit according to the known proposal, while improving the contact separation during circuit interruption, does not take care of detrimental effects due to contact bouncing during circuit closing operations. When such bouncing occurs, the values of instantaneous current interrupted between the contacts are often higher than during normal circuit opening operations.

It is, therefore, a more specific object of my invention to also minimize or eliminate one or several of the just-mentioned shortcomings of contactor shunt circuits involving a valve and an auxiliary voltage source. Another more specific object of the invention is to simplify the circuit design and reduce the space required by the provision of an auxiliary voltage source in the shunt circuit. Another object of the invention is to obtain a current reducing action of the shunt circuit during circuit closing operations of the contactor to obviate the transfer of material due to bouncing phenomena. Still another object is to provide for current-reducing action during closing operations as well as during opening operations of the contactor.

According to the invention, a valve circuit paralleling the synchronous or periodically operating contactor of a switching or current translating apparatus of the above-mentioned kind is connected with the appertaining switching reactor so that this reactor has not only the effect of flattening the current wave near its zero passages but also impresses on the valve circuit an auxiliary voltage which, during the intervals of the circuit closing or opening operations of the contactor, has the polarity required to reduce the voltage then obtaining across the contact gap. In this manner, the constructional and space requirements for the provision of an auxiliary voltage are greatly reduced not only because the switching reactor performs also the function of such a voltage source, but also because the auxiliary voltage is produced only during the intervals in which it is needed, i. e. in which the contactor contacts are separating or closing, so that the valve in the shunt circuit is called upon to conduct current only during intervals of very short duration.

The foregoing and other objects and features of the invention will be apparent from the following description of the embodiments exemplified on the drawing, in which:

Figure 1 shows a single-phase circuit diagram of a rectifying apparatus according to the invention;

Figs. 2 and 3 show respective modified designs of part of the circuit of apparatus otherwise similar to that of Fig. 1;

Figs. 4 to 7 illustrate in a similar manner four respective other embodiments also in single-phase representation;

Figs. 9 and 10 are respective circuit diagrams of two single-phase embodiments of high current carrying capacity, while Fig. 11 shows schematically a top view of a triple contactor appertaining to the embodiment of Fig. 10.

Similar reference characters are used in the respective figures to denote functionally similar circuit elements.

Figure 7:
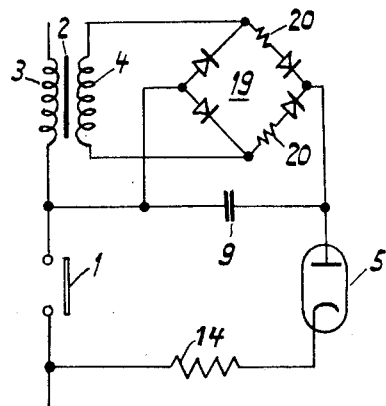

According to Fig. 1, the periodically operating contact 1 of a contactor is series connected with the main winding 3 of a saturating reactor 2 (switching reactor) in a load circuit to be controlled. The reactor 2 has a secondary winding 4 in which the above-mentioned auxiliary voltage is produced. Winding 4 is series connected with a valve 5 across the contact 1. Valve 5 may be a barrier-layer rectifier or a gas-discharge tube, a discharge device of low arc voltage, for instance, a metal vapor discharge tube such as a cesium tube being especially suitable.

The contact 1 of the apparatus is actuated in synchronism with the current or voltage wave of the load current to be controlled. Preferably, the operation is electromagnetic as is represented in Fig. 1. As shown, a control magnet 6 is series-connected in the load circuit for current-responsive control. Contact 1 is biased by a spring 7 toward its circuit opening position.

Assuming that an alternating-current wave is impressed across the terminals of the load circuit and is just passing through the zero value to thereafter increase to positive values, this current will at first flow through the reactor winding 3, the secondary winding 4, the valve 5, the contactor coil 6 and the load 8. As soon as the instantaneous current value reaches a positive magnitude at which the magnetic force due to excitation of coil 6 is sufficient to overcome the biasing force of spring 7, contact 1 closes. This occurs at an instantaneous current value very much smaller than the maximum amplitude of the current wave. At the closing moment, the shunt circuit of the winding 4 and valve 5 becomes short-circuited so that from now on the current passes only through the closed contact 1. When thereafter the current wave, beyond its maximum, declines to small instantaneous values near the subsequent zero passage, a moment will be reached when the force of coil 6 becomes insufficient to hold the contact 1 closed. Then contact 1 is opened by spring 7, and valve 5 becomes again conductive until it stops conducting when the decaying current passes through zero. During the following negative half cycle, valve 5 is non-conductive and contact 1 remains open. Consequently, the load 8 receives rectified direct-current.

During the just-described performance of the contactor, the secondary winding 4 of reactor 2 impresses an auxiliary voltage across the valve shunt circut in the direction needed to reduce the voltage across the contact gap. Since the voltage across valve 5, when the latter is conductive, has always the same direction, the just-mentioned reduction of the contactor gap voltage in this embodiment can be obtained only by having the auxiliary voltage from winding 4 act in the direction opposed to that of the valve voltage. However, since the auxiliary source 4 supplies an alternating current, the desired effect of reducing the contactor gap voltage occurs only during the contact-closing operation or only during the contact-opening operation rather than during both operations. Therefore, if the contactor is free of bouncing (for instance, as in designs of the type disclosed in my copending applicaton Serial No. 115.983, filed September 16, 1949, Electric Contact Device, assigned to the assignee of the present invention), the polarity of connection of the auxiliary voltage source 4 is preferably such that the contactor voltage is reduced only during the circuit-opening operation. On the other hand, if the conditions are such that it is readily possible to open the contactor at sufficiently small instantaneous current values to secure freedom from sparking without aid from devices according to the invention, then the disturbing phenomena due to possible contact bouncing can be minimized by so poling the auxiliary source 4 that the contactor voltage is reduced only during circuit-closing operations.

In order to exclude the disturbing effect of the inductivity of the transformer winding 4, this winding may be shunted by a circuit element of negligible inductivity. To this end, a capacitor 9 is provided in the embodiment of Fig. 1. A resistor of negligible inductance may be used instead. However, such a resistor would place a load on the auxiliary voltage source also during its active voltage periods and thus would reduce the efficiency. A notable improvement is obtained by connecting an auxiliary valve across the auxiliary voltage source 4 with such a polarity of connection that the valve is non-conductive during the one contactor operation in which the contactor voltage is reduced and has a limiting effect on the auxiliary voltage during the other contactor operation.

Fig. 2, showing only a modified portion of the circuit appertaining to apparatus according to Fig. 1, illustrates such an auxiliary valve at 10. The additional valve 10 may consist of a barrier-layer type rectifier with inherent capacitance. In that case, the shunt capacitor 9, serving to shunt the inductance of winding 4, may be given correspondingly smaller dimensions or may be fully eliminated. According to Fig. 2, an impedance member 11, such as a resistor, is series connected with valve 10 for limiting the current.

The operation of the apparatus according to Fig. 2 is as follows. When contact 1 is open and the voltage in the load circuit traverses the zero value to assume a positive amplitude, a current starts flowing through reactor winding 3, secondary winding 4, resistor 11 and valve 5. As explained, the switching reactor 2 is at first unsaturated and keeps the current wave flat for an interval of time immediately following the voltage zero passage. During this interval of unsaturated reactor condition, a voltage is induced in the secondary 4. This voltage, for instance, is so directed that it drives a current through the auxiliary valve 10 and the limiting resistor 11.

When, now, still during the weak-current interval, the contact 1 closes, only the voltage drop of the two valves 5 and 10 is at first effective across the contact gap. Consequently, the auxiliary voltage is initially effective with a rather small value; for instance, 0.5 volt. Subsequently, the closed contact 1 carries the full load current until this current again decays to very small values, and the switching reactor 2 again becomes unsaturated. The auxiliary voltage produced during the weak-current interval now obtaining, of course, has a direction opposed to that of the auxiliary voltage effective during the preceding weak-current interval. Consequently, during the opening operation of contact 1, the auxiliary voltage then supplied by reactor winding 4 is not shorted by the auxiliary valve 10 but is fully effective across the capacitor 9 and drives a compensating current through winding 4, resistor 11 and valve 5. As a result, the contact 1 is electrically relieved at the interrupting moment and can open practically without current load. In other words, the advantage of the auxiliary valve 10 lies in the fact that the auxiliary voltage is limited during the one contact operation in which it would otherwise be detrimental.

Instead of providing an auxiliary valve (10 in Fig. 2) of the barrier-layer or electronic type, particularly in voltage controlled rectifying apparatus, the auxiliary voltage source may be bridged by a contact during the one contactor operation in which this source would have the undesired effect of increasing the voltage across the contact gap. An embodiment of this kind is schematically illustrated in the circuit portion shown in Fig. 3 where the bridging contact is denoted by 12. Contact 12 may be connected or magnetically associated with the main contact 1 or with the magnet system or other means for driving the main contact, thus securing the necessary time relation between the operation of these two contacts.

In the apparatus according to Fig. 4, the auxiliary voltage obtained from the reactor secondary 4 has the effect of reducing the gap voltage of contact 1 during closing operation as well as during opening operation. This is achieved by the provision of the full-wave, two-phase rectifier circuit including two rectifier valves 13. These valves may consist of barrier layer units or tubes (or they may also be designed as contact rectifiers as shown in Fig. 5). As mentioned, the occurrence of contact bouncing during the closing operation of contact 1 may result in the interruption of currents higher than those occurring during circuit-opening operation. It is, therefore, desirable to apply during contact closing a higher auxiliary voltage than during circuit opening. For that reason, the tap of reactor winding 4 (Fig. 4) is displaced from the customary mid position so that the alternating voltages impressed upon two paths of the two-phase rectifier circuit have different respective magnitudes. A resistive impedance 14 series connected with valve 5 in the contact shunt circuit serves to limit and shape the current in the shunt circuit. A similar current limitation is also caused by the resistance of the one portion of winding 4 that is conductive at a time.

As mentioned, the rectifying means for the auxiliary voltage derived from the switching reactor may consist of contact rectifiers. In the modification shown in Fig. 5, the periodically and alternately operating contacts of such a contact rectifier are denoted by 15 and 16. These contacts are series connected with resistors 17 and 18, respectively. A capacitor 9 is connected directly across the main contact 1. Contacts 15 and 16 may be controlled by the same means that control the main contact 1 of the apparatus. In current-controlled contact rectifiers, the auxiliary contacts 15, 16 are preferably electromagnetically actuated in dependence upon the load current. The switching time of the auxiliary contacts 15, 16 should be larger than that of the main contact 1. The auxiliary contacts are always actuated when not traversed by current, i. e., when valve 5 is non-conductive. For instance, contact 15 may close after the termination of the weak-current interval appertaining to the closing operation of the main contact 1 while contact 16 will then open. The auxiliary voltage from winding 4 is then effective through the closed contact 15 during the circuit opening interval. After termination of the circuit opening interval, contact 16 will close and contact 15 will open so that during the subsequent circuit closing interval the auxiliary voltage is effective through the closed contact 16 and has again the desired direction. The shunt valve 5 across the main contact 1 is shown as a triode, such a tube being advantageous for the voltage control of the rectifying apparatus. The connection of the capacitor directly across the main contact 1 has the advantage that it obviates the necessity of considering minimum inductance conditions of the circuit when determining the spacial arrangement of the shunt valve 5.

The embodiment shown in Fig. 6 is similar in principle to those of Figs. 4 and 5, but instead of a two-phase rectifier circuit, has two valve circuits connected in parallel relation to each other across the contactor gap. The auxiliary voltage in one parallel circuit is directed to reduce the contactor gap voltage during circuit closing, while the auxiliary voltage of the other parallel circuit causes a gap voltage reduction during circuit opening. In this embodiment, the switching reactor 2 has a main winding 3 and two secondary windings 4a and 4b. The parallel circuit of valve 13a and resistor 17 serves to facilitate the opening operation of contact 1 due to the effect of the auxiliary voltage produced in winding 4a. During the closing operation of contact 1, the auxiliary voltage of winding 4a has an unsuitable direction. Then, however, the separate compensating circuit of valve 13b, secondary reactor winding 4b and resistor 18 is effective to secure the desired voltage reduction.

The embodiment of Fig. 7 is similar to those of Figs. 4 to 6 in providing an auxiliary voltage whose direction is such as to reduce the contactor gap voltage during closing as well as during opening operations. According to Fig. 7, however, the reactor secondary 4 is connected with the valve shunt circuit of the contactor by a rectifier bridge circuit 19 comprising four valve units. The provision of such a bridge type rectifier instead of the two-phase circuit according to Figs. 4 to 6 has the advantage that the auxiliary reactor winding 4 need not have a tap, or that instead of two secondary reactor windings only one winding is required.

In order to obtain with a bridge type rectifier according to Fig. 7 an auxiliary voltage whose magnitude is different for circuit closing than for circuit opening, the two alternately conducting branches of the bridge circuit 19 include series impedance members 20 whose impedance values are selected in accordance with the desired difference in output voltages.

The auxiliary voltage impressed across the contactor contact during the weak-current interval near the current zero passages varies with the load, especially in multiphase contact rectifiers. Corresponding, the length or duration of the weak-current interval is also subject to load responsive variations. The hysteresis loop of the switching reactor is also dependent upon the load current and hence also affects the length of the interval.

Such load-dependent variations, however, can be minimized or virtually obviated by various means. One way, according to the invention, is to premagnetize an additional series reactor in dependence upon the load current. In this manner, the length of the weak-current interval is kept substantially independent of load variations. Furthermore, for making the auxiliary voltage at least approximately independent of the current to be switched, an additional circuit element with a non-linear characteristic, such as a valve, may be connected parallel to the auxiliary voltage source.

Figure 8:
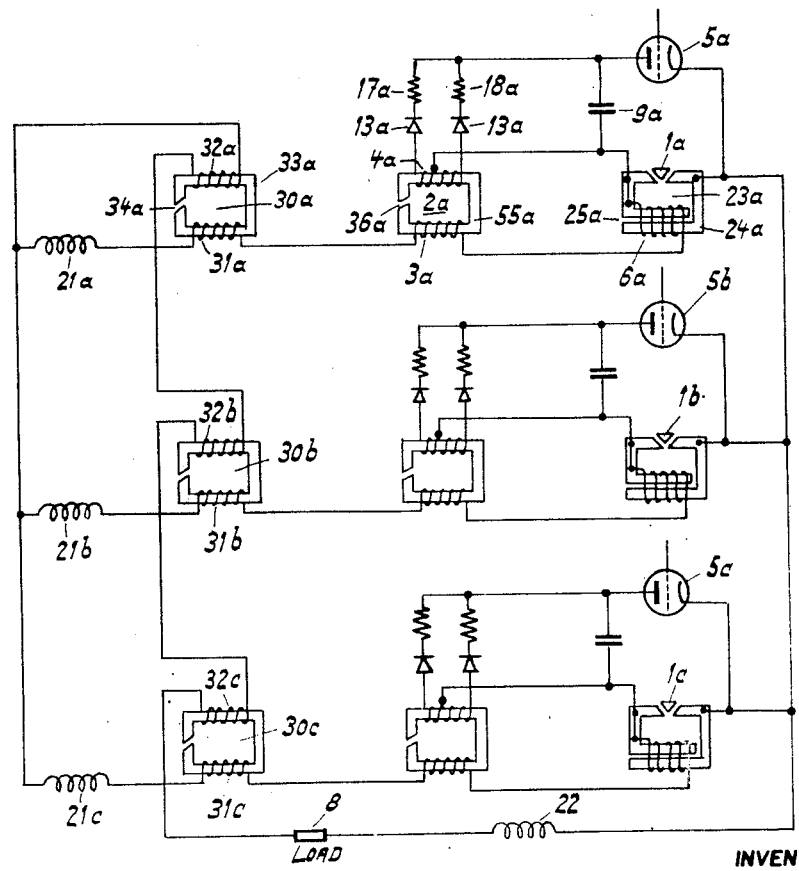
Fig. 8 is a circuit diagram of still another embodiment designed as a three-phase rectifier.

The three-phase rectifying apparatus according to Fig. 8 embodies the just-mentioned compensating features. In Fig. 8, the three secondary windings of a power supply transformer are denoted by 21a, 21b and 21c. The load circuit comprises a direct-current load 8 and a cathode reactor 22. The phase circuit energized by winding 21a is equipped with a periodic electromagnetic contactor 23a whose contact is denoted by 1a, a switching reactor 2a with a main winding 3a and a tapped secondary winding 4a, and an additional series reactor 30a for load compensation. Reactor 30a has a main winding 31 and a premagnetizing winding 32a disposed on an iron core 33a with an air gap 34a. The switching reactor 2a has a core 35a with an air gap 36a. The valve shunt circuit comprises a main valve 5a, a capacitor 9a, two auxiliary valves 13a and two limiting resistors 17a, 18a. This shunt circuit is designed substantially in accordance with Figs. 4 and 5. The contact 1a (Fig. 8) is actuated by a magnet system 23a energized by a control winding 6a. The magnet core 24a of system 23a has an air gap at 25a for electrically insulating the two core portions that are magnetically and electrically bridged by the contact 1a when the latter is in the circuit closing position. The design of this contactor is substantially as disclosed in my above-mentioned copending patent application. The two other phases of the three-phase rectifying apparatus are designed in the same manner as the above-described phase a.

The operation of the apparatus is as follows: When the current in phase a increases from zero, it flows at first through the main valve 5a and magnetizes the switching reactor 2a. During the weak-current interval produced by the initially high reactance of the switching reactor, an auxiliary voltage is induced in the secondary winding 4a. This auxiliary voltage is rectified by the auxiliary valves 13a and has the effect of reducing the voltage drop in the valve shunt circuit across the contact 1a. Consequently, the contact 1a, when being actuated by the effect of the increasing load current traversing the control winding 6a, closes the circuit under conditions where there is practically no voltage across the contact gap and consequently practically no current flow through the just closing contact. Shortly thereafter the shunt valve 5a becomes non-conductive, and from then on the entire load current in this phase passes through the contact 1a. Prior to the next following opening of the contact 1a, the switching reactor 2a becomes again unsaturated. Then a voltage is produced in the secondary reactor winding 4a. This voltage has the effect of depressing the voltage across the contact gap and hence reduces the current in the contact practically to zero.

The rectified direct current flows through the cathode reactor 22 and the load 8 as well as through the premagnetizing windings 31a, 31b and 31c of the three auxiliary reactors 30a, 30b and 30c. At low direct-current values these reactors represent high inductances due to the slight premagnetization of their cores. This has the effect of providing a relatively long commutation period for the time-overlapping conductive operation of two successively energized phases. At a high direct-current load and a correspondingly high premagnetization of the auxiliary reactors, however, their effective inductance declines to such an extent that the commutation performance will occur in the same period as with small direct-current loads despite the increased phase currents. As a result, the periodic magnetization of the switching reactors and the voltage effective at the switching reactors during the weak-current intervals are largely independent of load variations. This applies also to the auxiliary voltage and to the duration of the weak-current intervals. If the compensating devices are properly adjusted for any given load, they will also satisfactorily operate for other load conditions.

The following numerical examples will further elucidate the performance of the apparatus. In a given example for rectifying alternating current of 50 C. P. S., the circuit opening movement of the contactor contacts 1a, 1b, 1c occurs within in about $2 \times 10^{-4}$ sec. The duration of the weak-current interval available for the contact opening operation is about $3 \times 10^{-4}$ sec. The difference of about $10^{-4}$ sec. between the opening of the contact and the current zero passage is a safeguard against arc backs. The holding current of the contactor is about 3 amps. The reversed magnetization of the switching reactor, and hence the weak-current interval caused thereby, commences at this current value of about 3 amps. The voltage drop of the main valves 5a, 5b, 5c may vary between the limits of about 0.5 volt to about 30 volts, and the auxiliary voltage must be dimensioned accordingly. As a rule, a valve of minimum voltage drop is favorable, for instance, an alkali vapor discharge tube, particularly a cesium tube. For special purposes, particularly at low voltages (below 20 volts) and also at extremely high voltages (above 1,000 volts), valves of a different type are well suitable, such as barrier layer rectifiers or other types of rectifier tubes.

With general reference to apparatus according to the invention, the following will be of interest.

At transfer of fine particles of contact material occurs only during contact separations, i. e. during the circuit opening operation proper or when bouncing occurs during the contact closing period. This transfer of material is essentially determined by the magnitude and direction of the voltage obtaining across the switch contacts prior to the galvanic separation. At extremely small switching velocities, the fine transfer of material can be fully prevented if the voltage across the switching contact immediately prior to the galvanic separation is kept below a voltage corresponding to the fusion temperature of the contact material (critical fusion voltage). At high switching velocities, however, the voltage at the contacts during the mentioned interval of time may exceed the critical fusion voltage because during this short interval the energy supplied to the contact points is insufficient for reaching the fusion temperature. As mentioned, the voltage at the contacts can be kept small at all loads by the above-mentioned load compensating means. It is, however, also advantageous to select the magnitude of the auxiliary voltage so that the voltage across the switching contacts at the moment of contact separation is zero for a medium value of current to be switched and is effective in one direction at higher currents and in the other direction at lower currents. In this manner the transfer of material is fully avoided over a certain medium range of load currents. Outside of this range a transfer of fine particles may occur alternately in both directions and hence tends to compensate itself at least partially. In analogy, the transfer of fine particles can be prevented or at least partially compensated by selecting the magnitude of the auxiliary voltage for the circuit closing and opening so that the voltage across the switch contacts is effective in one direction during closing and in the other direction during opening.

If under conditions of variable loads the voltage obtaining at the switch contacts varies over a range larger than the desired range just mentioned, the following means may be resorted to for reducing the voltage variations. When using a gaseous or vapor discharge tube, in particular a metal vapor tube, its working point is to be chosen so that the voltage across a series connection of this tube and of an ohmic resistor (14 in Fig. 4) is at least approximately independent of the current flowing through the shunt circuit.

As far as the above-described basic operation is concerned, it is inessential where the auxiliary voltage is supplied to the valve shunt circuit. However, in order to prevent the occurrence of excessively high voltages between the main winding and the auxiliary winding of the switching reactor, it is preferable to connect the secondary winding with the parallel circuit at such a point that one pole of the auxiliary voltage source (secondary reactor winding) is directly connected with one terminal point of the main winding of the switching reactor as is exemplified by the above-described embodiments.

Several parallel operating contactors are preferably used if the currents to be controlled are of a very high magnitude. There are two different ways available for avoiding or minimizing the coarse and fine transfer of material at all parallel connected switching places. The inductivity of the circuit comprising the parallel connection of any two switching places may be kept as small as possible, and the individual switch contacts may be operated successively. Then the auxiliary voltage source need be effective only during the switching operation of the last opening and/or the first closing switching contact. On the other hand, the current distribution through the individual switching contacts may be stabilized by means of at least one series connected inductance, each contact being given a parallel circuit of minimum inductivity. Embodiments of apparatus involving such parallel operating contacts will be described presently.

Fig. 9 shows a current-controlled contact rectifier of high current capacity which is equipped with several similarly designed contacts 1a, 1b, 1c operating in an electric and magnetic parallel relation to one another. If the parallel connection of these contacts involves very slight inductances, for instance, if the contacts are combined within a single electromagnetic switching unit (for instance, for 1,000 amps.), it suffices to provide only a single compensating circuit for all parallel connected contacts. The current is commutated from the last opening contact to the valve shunt circuit while the previously opening contacts are shorted during the circuit opening operation by the other, still closed contacts. The magnet system 23 for actuating the three contacts 1a, 1b, 1c has a subdivided magnet core 24 with an air gap at 25 in order to electrically insulate the current conducting pole shoe and contact elements of the system. The following numerical example may serve to further elucidate this embodiment. The reactor 2 may be dimensioned to commence a weak-current interval when the load current in reactor winding 3 drops below an instantaneous current value of 3 amps. Under the same conditions, the holding force of the contactor control coil 6 is to decline below the critical value so that the three contact elements 1a, 1b and 1c commence their opening movement also when the load current drops below the instantaneous value of 3 amps. In now available apparatus of this kind, the ampere windings necessary for the contactor control coil to provide minimum contact holding force amounts to about 150. Hence, 50 windings for coil 6 are required under the just-mentioned conditions.

Figs. 10 and 11 illustrate another applicable way of connecting several contacts in parallel relation, especially for direct-current loads above 1,000 amps. The individual contacts 1a, 1b, 1c are parallel connected through relatively large inductances and are equipped with individual compensating circuits for facilitating the respective switching operations. The desired high inductance in series with the individual contacts is obtained by separating and insulating the current leads of the individual contacts in the main winding of the switching reactor 2. To this end the main reactor winding is split into three portions 3a, 3b and 3c, and each portion is series connected with a corresponding portion 6a, 6b or 6c of the contactor control coil. Each of the compensating circuits attached across the individual contacts is designed substantially in accordance with Fig. 1 and thence need not be further described. The magnet cores 43a, 43b and 43c of the parallel contactors are electrically insulated from each other.

The design and rating may be such that each of the contacts 1a, 1b, 1c can carry an initial current of, for instance, 3 amps. at the contact closing moment with the aid of its appertaining valve shunt circuit. The circuit opening interval, therefore, commences at a phase current of 9 amps. which makes it possible to use a less costly design of the switching reactor. With the same contact holding number of ampere turns for the contactor control coil as mentioned with reference to the apparatus of Fig. 9, only one-third of the coil windings are necessary, thus also affording an improved economy as regards the contactor construction.

As apparent from the above-described embodiments shown in Figs. 5 and 6, a capacitor may be connected in direct parallel relation to the contact of the synchronous or periodic contactor. While such a parallel connection is known as such, it may be mentioned that in apparatus according to the invention the switching performance may be detrimentally affected by the inductance of the parallel connection. It was found, however, that good results are obtained when the value of the inductance effective in such a capacitive shunt circuit satisfies the condition:

$$L < C_k \left(\frac{u}{i_0}\right)^2$$

wherein $C_k$ denotes the contact capacitance obtaining immediately after the galvanic contact separation, $u$ denotes the maximum voltage at the switch contacts at which a spark-free switching can be obtained, this voltage being correlated to the current which traverses the contact to be opened at the moment of the galvanic separation, and $i_0$ denotes the current to be interrupted.

The invention is not limited to the embodiments specifically mentioned and shown in this disclosure. Aside from being applicable to voltage or current controlled contact rectifiers, it is favorably applicable, for instance, to alternating-current switches for general purposes.

While in the foregoing the invention is disclosed and explained with particular reference to electromagnetically controlled contact rectifiers, it is also applicable for other current translating or general alternating-current switching purposes requiring synchronous switching and may be carried out with contact control means other than voltage or current controlled electromagnets. For instance, welding contactors or overload responsive circuit breaking apparatus or disconnect switches to operate near current or voltage zero passages may incorporate the invention by means of circuits and devices designed and operative as explained and illustrated in this disclosure; and it will also be apparent to those skilled in the art that the invention involves features applicable to contactors driven in a manner different from that specifically exemplified; for instance, by a mechanical drive actuated and synchronized by a synchronous motor.

I claim:

1. Electric current translating apparatus, comprising a load circuit, a synchronous contactor having contact means in said circuit for periodically closing and opening said circuit, a saturable switching reactor having a primary winding series-connected with said contact means in said circuit and having a secondary winding to provide therein an auxiliary voltage, and valve means connected in series with said secondary winding across said contact means.

2. Electric current switching apparatus, comprising an alternating-current circuit, a synchronous contactor having contact means in said circuit for opening and closing said circuit, a saturable switching reactor series-connected with said contact means in said circuit, a valve means and a substantially induction-free impedance member connected in series with each other across said contact means, and a voltage supply circuit connected across said impedance member and inductively coupled with said reactor to impress across said contact means an auxiliary voltage from said reactor.

3. Electric current translating device, comprising a load circuit, a synchronous contactor having contact means in said circuit, a saturable switching reactor having a primary winding series-connected with said contact means in said circuit and having a secondary winding to provide therein an auxiliary voltage, valve means and a capacitive circuit member series-connected with each other across said contact means, and said secondary winding being connected across said circuit member and having a terminal point in common with said primary winding.

4. Electric current translating apparatus, comprising a synchronous contactor having periodically operative contact means for circuit closing and opening operations, a saturable switching reactor series-connected with said contact means, a shunt circuit connected across said contact means and having valve means, said circuit having a portion inductively parallel connected with said reactor to be impressed by auxiliary voltage from said reactor and said circuit portion having a poling in the gap-voltage reducing sense relative to said circuit closing operations only.

5. Electric current translating apparatus, comprising a load circuit, a synchronous contactor having contact means in said circuit for periodic circuit closing and opening operations, a saturable switching reactor series-connected with said contact means, auxiliary voltage supply means coupled with said circuit and having an auxiliary voltage of a given phase relation to the voltage at said contact means, valve means series-connected with said supply means across said contact means to have said auxiliary voltage reduce said voltage at said contact means during one of said operations, and valve means connected across said supply means and being poled in the substantially non-conductive sense relative to said one operation while limiting said auxiliary voltage during said other operation.

6. Electric current translating apparatus, comprising a synchronous contactor having contact means for periodic circuit closing operation and circuit opening operation, a saturable switching reactor having a primary winding series-connected with said contact means and having a secondary winding to provide therein an auxiliary voltage, valve means series connected with said secondary winding across said contact means to have said auxiliary voltage reduce the voltage at said contact means during one of said operations, and valve means connected across said secondary winding and poled to be non-conductive during said one operation.

7. Electric current translating apparatus comprising a load circuit, a synchronous contactor having contact means in said circuit for closing and opening said circuit, a saturable switching reactor having a primary winding series-connected with said contact means and having a secondary winding, valve means, and a full-wave rectifier inputwise connected with said secondary winding and outputwise series connected with said valve means across said contact means.

8. In apparatus according to claim 7, said rectifier comprising a rectifier bridge circuit having input terminals connected across said secondary winding and having output terminals connected with said valve means and contact means.

9. In apparatus according to claim 7, said rectifier consisting essentially of periodic contact means synchronously controlled to open and close during non-conductive intervals of said valve means.

10. In apparatus according to claim 7, said full-wave rectifier being asymmetrical and having an output voltage higher during closing periods than during opening periods of said contact means.

11. Electric current translating apparatus comprising a synchronous contactor having contact means for periodic closing and opening operations, a saturable switching reactor having a primary winding series-connected with said contact means and having a secondary winding, said secondary winding having two ends and a voltage-asymmetrical intermediate tap to provide unequal voltages during successive half-wave periods respectively, a two-phase rectifier circuit extending through said ends and said tap, and valve means connected in series with said rectifier circuit across said contact means, whereby said rectifier circuit impresses across said contact means a rectified voltage, said rectified voltage being higher during said contact closing operation than during said contact opening operation and having gap-voltage reducing polarity at said contact means.

12. Electric current switching apparatus, comprising a synchronous contactor having contact means for circuit closing and opening operations, a saturable switching reactor having a primary circuit series-connected with said contact means and having a secondary circuit to provide an auxiliary voltage in said secondary circuit, and valve means connected in series with said secondary circuit across said contact means, whereby the gap voltage across said contact means is reduced by said auxiliary voltage during at least one of said operations.

13. In apparatus according to claim 12, said secondary circuit having a poling in the sense corresponding to reduction of the contact-means gap voltage only during said circuit opening operations.

14. In apparatus according to claim 12, said reactor having a plurality of reactance windings parallel connected in said primary reactor circuit and magnetically coupled with each other, and said contact means having a corresponding plurality of movable contact members individually series connected with said respective reactance windings and mutually parallel connected in said primary circuit, said secondary reactor circuit having a corresponding plurality of mutually parallel portions, and said valve means having a plurality of valve members series connected with said respective circuit portions across said respective contact members.

15. Apparatus according to claim 12, comprising a non-linear impedance member parallel connected with said shunt circuit at the reactor side thereof so that the magnitude of said auxiliary voltage is approximately independent of the load current of said contact means.

16. Apparatus according to claim 12, comprising a direct-current load circuit connected with said contact means to receive rectified current through said contact means, said reactor having a premagnetizing winding series connected with said load circuit for premagnetizing said reactor in dependence upon the load current in said circuit.

17. In apparatus according to claim 12, said auxiliary voltage having a magnitude at which said gap voltage across said contact means is zero at the separation moment of said contact means for a given medium value of current to be switched by said contact means, whereby said gap voltage has one polarity at higher values and the opposite polarity at smaller values of said current.

18. Apparatus according to claim 12, comprising another shunt circuit directly parallel connected to said contact means and having a capacitance member, the inductance (L) due to said other shunt circuit being smaller than the product of the contact capacitance ($C_k$) of said contact means immediately after the moment of contact separation times the square of the ratio of the maximum contact voltage ($u$) permissible at said moment for spark-free switching and the current ($i_0$) then to be interrupted:

$$L < C_k \left(\frac{u}{i_0}\right)^2$$

19. Electric current switching apparatus, comprising a periodic contactor having contact means for periodic circuit closing and opening operations, a saturable switching reactor having a primary circuit series connected with said contact means and having secondary circuit means to provide an auxiliary voltage, a shunt circuit connected across said contact means and having valve means, and full-wave rectifier means connected between said secondary circuit means and said shunt circuit for rectifying said auxiliary voltage and impressing it on said shunt circuit during said closing and opening operations.

20. Electric current translating apparatus, comprising a load circuit, a synchronous contactor having contact means in said circuit, a saturable switching reactor having a reactance winding series connected with said contact means in said circuit and having a secondary circuit to provide therein an auxiliary voltage, said secondary circuit and said winding having a common point of potential, and valve means, said secondary circuit being connected in series with said valve means across said contact means.

21. Electric current translating apparatus, comprising a synchronous contactor having contact means for periodical opening and closing operations, a saturable switching reactor having a primary circuit series-connected with said contact means and having a secondary circuit, full-wave rectifier means inputwise connected with said secondary circuit and having two branches whose rectified output voltages have different magnitudes during different respective half-wave periods, valve means, said rectifier circuit being outputwise series connected with said valve means across said contact means, and said valve means and rectifier circuit having a polarity of connection corresponding to larger voltage reduction at said contact means during said closing operations than during said opening operations.

22. Electric current translating apparatus, comprising a main circuit, a periodic contactor having a plurality of successively acting and phase-overlapped contact means for periodic circuit closing and opening operations, said plurality of contact means being connected in said circuit in parallel relation to each other, a saturable reactor having a reactance winding series connected in said main circuit and having a secondary circuit to provide therein an auxiliary voltage, a shunt circuit connected across one of said contact means last acting during one of said operations, said shunt circuit having valve means and having a portion connected in said secondary reactor circuit to be impressed by said auxiliary voltage, and said shunt circuit being poled relative to said contact means to reduce the voltage across said one contact means during said one operation.

23. Apparatus according to claim 22, comprising a plurality of inductive circuit members individually series connected with said respective contact means so that said members lie parallel to one another for stabilizing the load distribution between said contacts.

24. Electric current translating apparatus, comprising a synchronous contactor having contact means, a saturable switching reactor series connected with said contact means, two shunt circuits connected in parallel relation to each other across said contact means, said shunt circuits being inductively coupled with said reactor to be impressed by auxiliary voltage from said reactor and having respective valve means of mutually opposed poling so as to reduce the gap voltage across said contact means during circuit opening and circuit closing operations, respectively.

ERWIN WETTSTEIN.

REFERENCES CITED

The following references are of record in the file of this patent:

UNITED STATES PATENTS

| Number | Name | Date |
| --- | --- | --- |
| 1,183,882 | Koppitz | May 23, 1916 |
| 1,265,354 | Mershon | May 7, 1918 |
| 1,374,534 | Storer | Apr. 12, 1921 |
| 2,285,691 | Wegener et al. | June 9, 1942 |
| 2,293,296 | Jonas | Aug. 18, 1942 |
| 2,375,609 | Zuhlke | May 8, 1945 |
| 2,465,682 | Goldstein | Mar. 29, 1949 |